United States Patent [19]
Kouris

[11] Patent Number: 6,114,773
[45] Date of Patent: Sep. 5, 2000

[54] HYDRAULIC TURBINE ASSEMBLY

[76] Inventor: Paul S. Kouris, Lot 20 Ricketts Court, Kalorama, Victoria, Australia, 3766

[21] Appl. No.: 08/787,926

[22] Filed: Jan. 23, 1997

[30] Foreign Application Priority Data

Jan. 25, 1996 [AU] Australia ............................. PN 7723

[51] Int. Cl.⁷ ..................................................... F03B 1/00
[52] U.S. Cl. ................................ 290/52; 290/54; 60/398; 415/201
[58] Field of Search ................................... 290/52, 43, 54; 60/398; 415/909, 201; 416/132 B, 197 A

[56] References Cited

U.S. PATENT DOCUMENTS

| | | | |
|---|---|---|---|
| 3,736,744 | 6/1973 | Bailey | 60/6 |
| 3,803,422 | 4/1974 | Krickler | 290/52 |
| 4,364,228 | 12/1982 | Eller | 60/398 |
| 4,381,645 | 5/1983 | Galuska | 60/398 |
| 4,794,544 | 12/1988 | Albright et al. | 364/494 |
| 4,955,789 | 9/1990 | Chacour et al. | 415/201 |
| 5,780,935 | 7/1998 | Kao | 290/52 |

*Primary Examiner*—Nestor Ramirez
*Assistant Examiner*—Nicholas Ponomarenko

[57] ABSTRACT

A new hydraulic turbine assembly for deriving extra energy out of a conventional hydroelectric power generating system by incorporating a second turbine generator at the inlet from the reservoir. The inventive device includes a vertical water inlet pipe being extended into the water reservoir of a dam to deliver water to the conventional hydroelectric generating system. The vertical water inlet pipe has a water inlet point being positioned in the water reservoir to create an inlet free vortex formation. An outer housing tube having an inlet cone for collecting water from said inlet free vortex formation and an outlet draft in fluid communication with the vertical water inlet pipe to permit water to pass through the outer housing tube to the vertical water inlet pipe. A rotor and turbine assembly having a rotor unit and at least one generator unit for creating electrical energy is disposed within the outer housing tube to permit rotation of the rotor unit within the outer housing unit by water passing through the outer housing tube. Each of the generator units is operationally coupled to the rotor unit so that the rotational energy of the rotor unit is transferred by the generator units into electrical energy.

12 Claims, 6 Drawing Sheets

HYDRAULIC TURBINE ASSEMBLY

BACKGROUND OF THE INVENTION

1. Field of the Invention

The present invention relates to hydraulic turbines and more particularly pertains to a new hydraulic turbine assembly for deriving extra energy out of a conventional hydroelectric power generating system.

2. Description of the Prior Art

The use of hydraulic turbines is known in the prior art. More specifically, hydraulic turbines heretofore devised and utilized are known to consist basically of familiar, expected and obvious structural configurations, notwithstanding the myriad of designs encompassed by the crowded prior art which have been developed for the fulfillment of countless objectives and requirements.

Known prior art hydraulic turbines include U.S. Pat. Nos. 4,437,017; 4,963,780; 4,219,303; 4,816,697; 4,443,707 and 4,284,899.

While these devices fulfill their respective, particular objectives and requirements, the aforementioned patents do not disclose a new hydraulic turbine assembly. The inventive device includes a vertical water inlet pipe being extended into the water reservoir of a dam to deliver water to the conventional hydroelectric generating system. The vertical water inlet pipe has a water inlet point being positioned in the water reservoir to create an inlet free vortex formation. An outer housing tube having an inlet cone for collecting water from said inlet free vortex formation and an outlet draft in fluid communication with the vertical water inlet pipe to permit water to pass through the outer housing tube to the vertical water inlet pipe. A rotor and turbine assembly having a rotor unit and at least one generator unit for creating electrical energy is disposed within the outer housing tube to permit rotation of the rotor unit within the outer housing unit by water passing through the outer housing tube. Each of the generator units is operationally coupled to the rotor unit so that the rotational energy of the rotor unit is transferred by the generator units into electrical energy.

In these respects, the hydraulic turbine assembly according to the present invention substantially departs from the conventional concepts and designs of the prior art, and in so doing provides an apparatus primarily developed for the purpose of deriving extra energy out of a conventional hydroelectric power generating system.

SUMMARY OF THE INVENTION

In view of the foregoing disadvantages inherent in the known types of hydraulic turbines now present in the prior art, the present invention provides a new hydraulic turbine assembly construction wherein the same can be utilized for deriving extra energy out of a conventional hydroelectric power generating system.

The general purpose of the present invention, which will be described subsequently in greater detail, is to provide a new hydraulic turbine assembly apparatus and method which has many of the advantages of the hydraulic turbines mentioned heretofore and many novel features that result in a new hydraulic turbine assembly which is not anticipated, rendered obvious, suggested, or even implied by any of the prior art hydraulic turbines, either alone or in any combination thereof.

To attain this, the present invention generally comprises a vertical water inlet pipe being extended into the water reservoir of a dam to deliver water to the conventional hydroelectric generating system. The vertical water inlet pipe has a water inlet point being positioned in the water reservoir to create an inlet free vortex formation. An outer housing tube having an inlet cone for collecting water from said inlet free vortex formation and an outlet draft in fluid communication with the vertical water inlet pipe to permit water to pass through the outer housing tube to the vertical water inlet pipe. A rotor and turbine assembly having a rotor unit and at least one generator unit for creating electrical energy is disposed within the outer housing tube to permit rotation of the rotor unit within the outer housing unit by water passing through the outer housing tube. Each of the generator units is operationally coupled to the rotor unit so that the rotational energy of the rotor unit is transferred by the generator units into electrical energy.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hydraulic turbine assembly apparatus and method which has many of the advantages of the hydraulic turbines mentioned heretofore and many novel features that result in a new hydraulic turbine assembly which is not anticipated, rendered obvious, suggested, or even implied by any of the prior art hydraulic turbines, either alone or in any combination thereof.

It is another object of the present invention to provide a new hydraulic turbine assembly which may be easily and efficiently manufactured and marketed.

It is a further object of the present invention to provide a new hydraulic turbine assembly which is of a durable and reliable construction.

An even further object of the present invention is to provide a new hydraulic turbine assembly which is susceptible of a low cost of manufacture with regard to both materials and labor, and which accordingly is then susceptible of low prices of sale to the consuming public, thereby making such hydraulic turbine assembly economically available to the buying public.

Still yet another object of the present invention is to provide a new hydraulic turbine assembly which provides in the apparatuses and methods of the prior art some of the advantages thereof, while simultaneously overcoming some of the disadvantages normally associated therewith.

Still another object of the present invention is to provide a new hydraulic turbine assembly for deriving extra energy out of a conventional hydroelectric power generating system.

Still a further object of the present invention is to allow, if required, water to be returned to the reservoir, utilizing the extra energy created, and thereby provide an alternative means of increasing the overall energy output of a conventional hydroelectric power generating system, by increasing the volume of water available to pass through that system.

Still yet a further object of the present invention is to allow, if required, any number of hydraulic turbine assemblies to be incorporated into the reservoir at various locations within the reservoir, their respective outlet pipes each ultimately joining with the main outlet pipe of the reservoir which leads to the conventional hydroelectric power generating system, thus multiplying the additional energy output of the hydraulic turbine assemblies within that system.

Yet another object of the present invention is to provide a new hydraulic turbine assembly which includes a vertical water inlet pipe being extended into the water reservoir of a dam to deliver water to the conventional hydroelectric generating system. The vertical water inlet pipe has a water inlet point being positioned in the water reservoir to create an inlet free vortex formation. An outer housing tube having an inlet cone for collecting water from said inlet free vortex formation and an outlet draft in fluid communication with the vertical water inlet pipe to permit water to pass through the outer housing tube to the vertical water inlet pipe. A rotor and turbine assembly having a rotor unit and at least one generator unit for creating electrical energy is disposed within the outer housing tube to permit rotation of the rotor unit within the outer housing unit by water passing through the outer housing tube. Each of the generator units is operationally coupled to the rotor unit so that the rotational energy of the rotor unit is transferred by the generator units into electrical energy.

Still yet another object of the present invention is to provide a new hydraulic turbine assembly that derives extra energy out of a conventional hydroelectric power generating system by incorporating a second turbine generator at the inlet from the reservoir while allowing the majority of the energy to be available to the conventional turbine arrangement of the dam.

Even still another object of the present invention is to provide a new hydraulic turbine assembly that has an inlet designed to allow a free vortex to form, the energy of which is currently lost in the form of other turbulence. The source of this energy is a combination of various parameters including initial pre-swirl in the water, the Coriolis effect from the rotation of the Earth and the shape of the reservoir.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
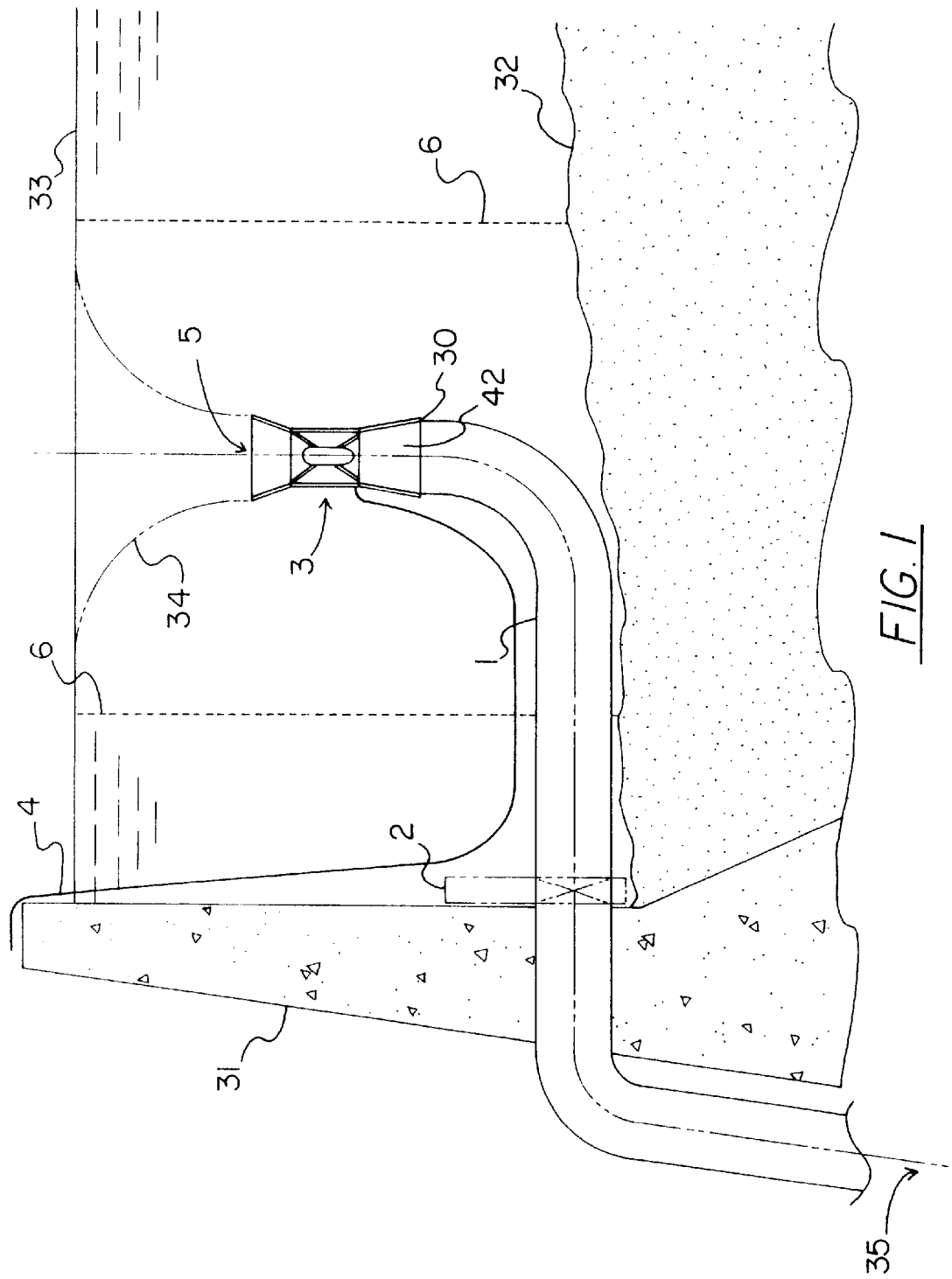
FIG. 1 is a right side view of a new hydraulic turbine assembly according to the present invention.

With reference now to the drawings, and in particular to FIGS. 1 through 9 thereof, a new hydraulic turbine assembly embodying the principles and concepts of the present invention and generally designated by the reference numeral 3 will be described.

More specifically, it will be noted that the hydraulic turbine assembly 3 comprises the vertical water inlet pipe (1), the outlet draft tube (8), and the rotor and turbine assembly (38).

As best illustrated in FIGS. I through 9, it can be shown that this hydraulic turbine assembly (3) is designed to derive extra energy out of a conventional hydroelectric power generation system by incorporating a second turbine generator at the vertical inlet from the reservoir.

The invention as shown in FIG. 1 consists of a modular designed removable electrical generation turbine unit attached to a vertically facing inlet water feed pipe that supplies water to the conventional down stream or lower electrical generation power plant.

As shown in FIG. 1, the vertical inlet pipe (1) presents itself with a flange receiving end (42) suitable for the attachment of the flange mount (30) of the hydraulic turbine unit (3) and may be fabricated from concrete, steel or other suitable materials in order to withstand the weight and torsional loading subjected by the unit.

The vertical inlet pipe's (1) horizontal positioning within the water reservoir (41) shall allow for adequate clearance from retaining or dam wall (31), base (32), water surface (33) and sides of the water reservoir (41) so as to enable the proper formation of a free inlet vortex (34) specific to the application. The water supply or flow can be slowed or stopped using a suitable form of valve or shut off gate (2) necessary for system shut down.

The flange mount (30) of the hydraulic turbine assembly (3) itself is flange mounted to the flange receiving end (42)

of the water inlet pipe (1) and so can be easily disassembled and removed for repairs, maintenance or to enable the conventional hydroelectric generating system (35) to operate as previously.

The power output cable (4) is appropriately insulated and exits from the hermetically sealed generator unit (29) to the required supply feed point outside the water reservoir (41).

The height of the water inlet point (5) of the unit from the free surface of the water (33) is such as to allow for the formation of a free vortex (34) above the hydraulic turbine assembly (3) and depends on the particular application. A screened enclosure structure such as a mesh screen (6) may be required depending on the application for the prevention of material other than water from entering the system.

Figure 2:
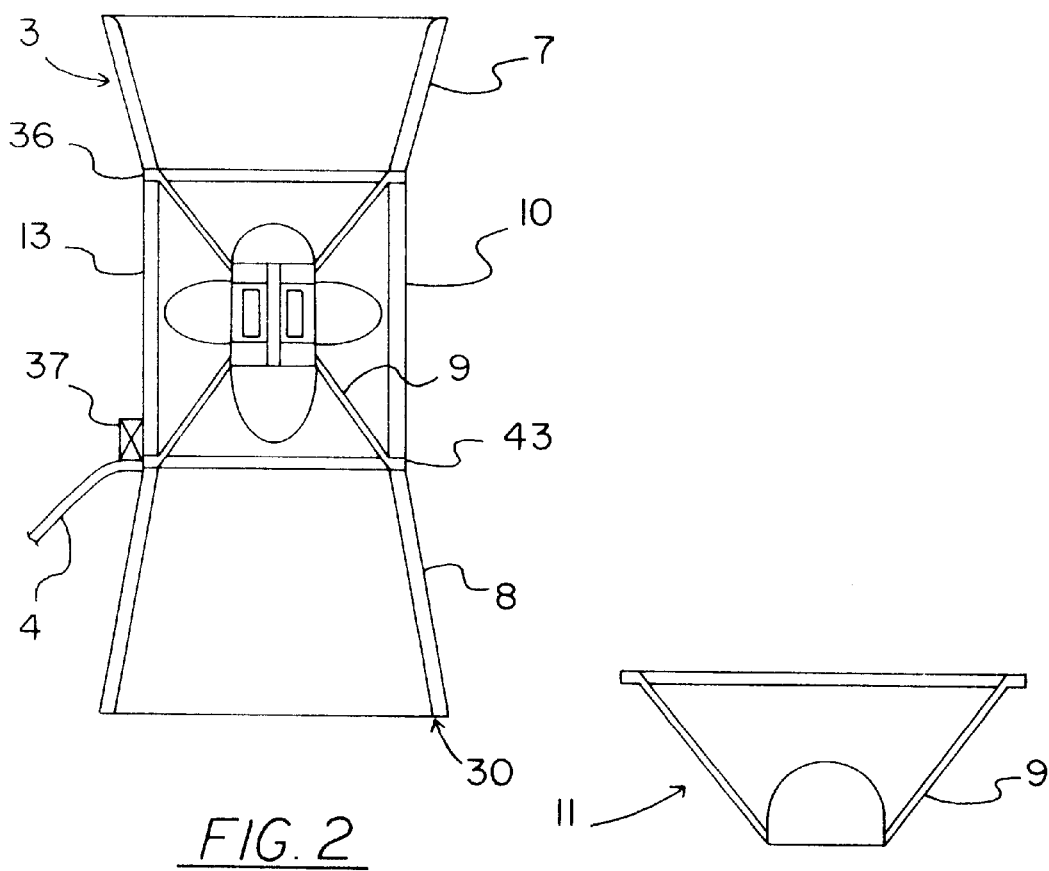
FIG. 2 is a side view of the hydraulic turbine unit.

As depicted in FIG. 2, the hydraulic turbine assembly (3) consists of three sections the first of which is described as the inlet cone (7). Its function is to collect the inlet water and is shaped to minimize inlet hydraulic pressure losses according to the particular application as well as to locally increase water velocity entering the turbine main section (10). The inlet cone (7) can be made from concrete or steel or other suitable materials according to the specific application and must withstand the high water velocities in its proximity and also the weight of the whole of the unit for unit installation and disassembly. The inlet cone (7) is flange mounted at the flanged joint (36) to the main section (10) and can be disassembled from it.

The outlet draft tube (8) is diverging in shape and is shaped so as to reduce turbine exit water velocity and to further increase the energy potential across the turbine. Its construction is similar to that of the inlet cone (7). The outlet draft tube (8) is also flange mounted to the main section (10) at the flanged joint (43) and can also be disassembled from it.

The power outlet cable (4) exits the hydraulic turbine assembly (3) via one of the turbine support pillars (9) and may either pass through a hollow support pillar (9) from the hydraulic turbine assembly (3) or be attached along it. The exit point may also be a hermetically sealed junction box (37) where disconnection is possible separating the cable (4) from the rest of the unit.

The hydraulic turbine assembly (3) main section (10) completes the three part structure of the hydraulic turbine assembly (3) and is the working section containing the turbine rotor and electrical power generating equipment. Its outer housing tube (13) is made from similar materials to the inlet cone (7) and outlet draft (8) and mounts to each respectively at its inlet and outlet flanged joints (36, 43) mount to each respectively.

Figure 3:
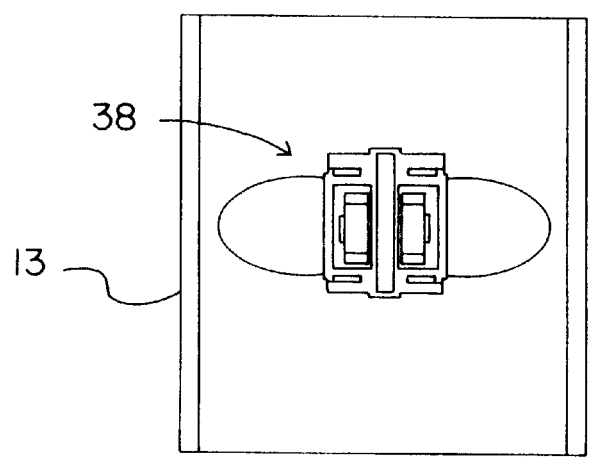
FIG. 3 is an exploded isometric illustration of the hydraulic turbine assembly main section.
Figure 3:
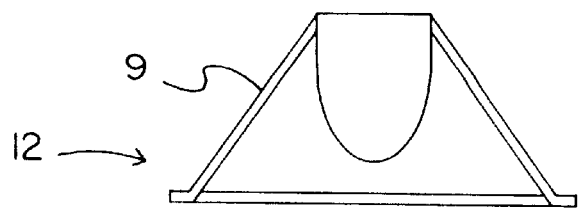

Continuing the modularity of the concept when separated from the inlet cone (7) and outlet draft (8), the main section (10) as shown in FIG. 3 can be further disassembled to reveal a top cap assembly (11) flange mounted between the main section (10) and inlet cone (7) containing the top support pillars (9) that help suspend the rotor and turbine assembly (38) in the middle of the water stream as well as the streamlined top cap (11). The purpose of the top cap assembly (11) is to minimize the hydraulic form losses of the rotor and turbine assembly (38) and does not rotate with the rotor unit (26).

The support pillars (9) are also hydrodynamically designed to minimize form drag and also do not rotate. Similarly, the lower cap assembly (12) is a structure that does not rotate but serves to support the rotor and turbine assembly (38) whilst minimizing drag. The flanged outer housing tube (13) completes the support structure for the rotor and turbine assembly (38) as well as of course containing the water.

Figure 4:
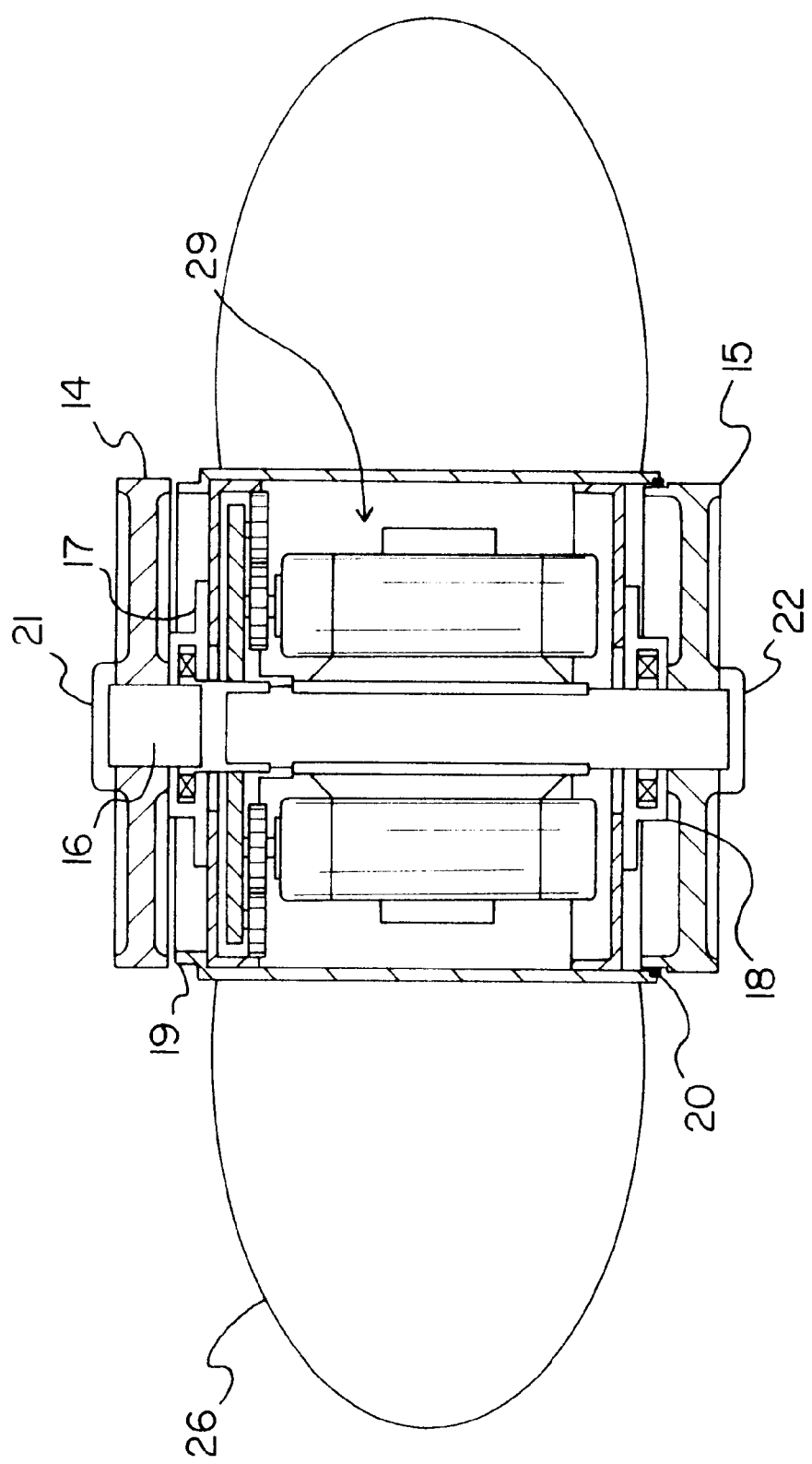
FIG. 4 is a side view of the rotor & turbine assembly.
Figure 5:
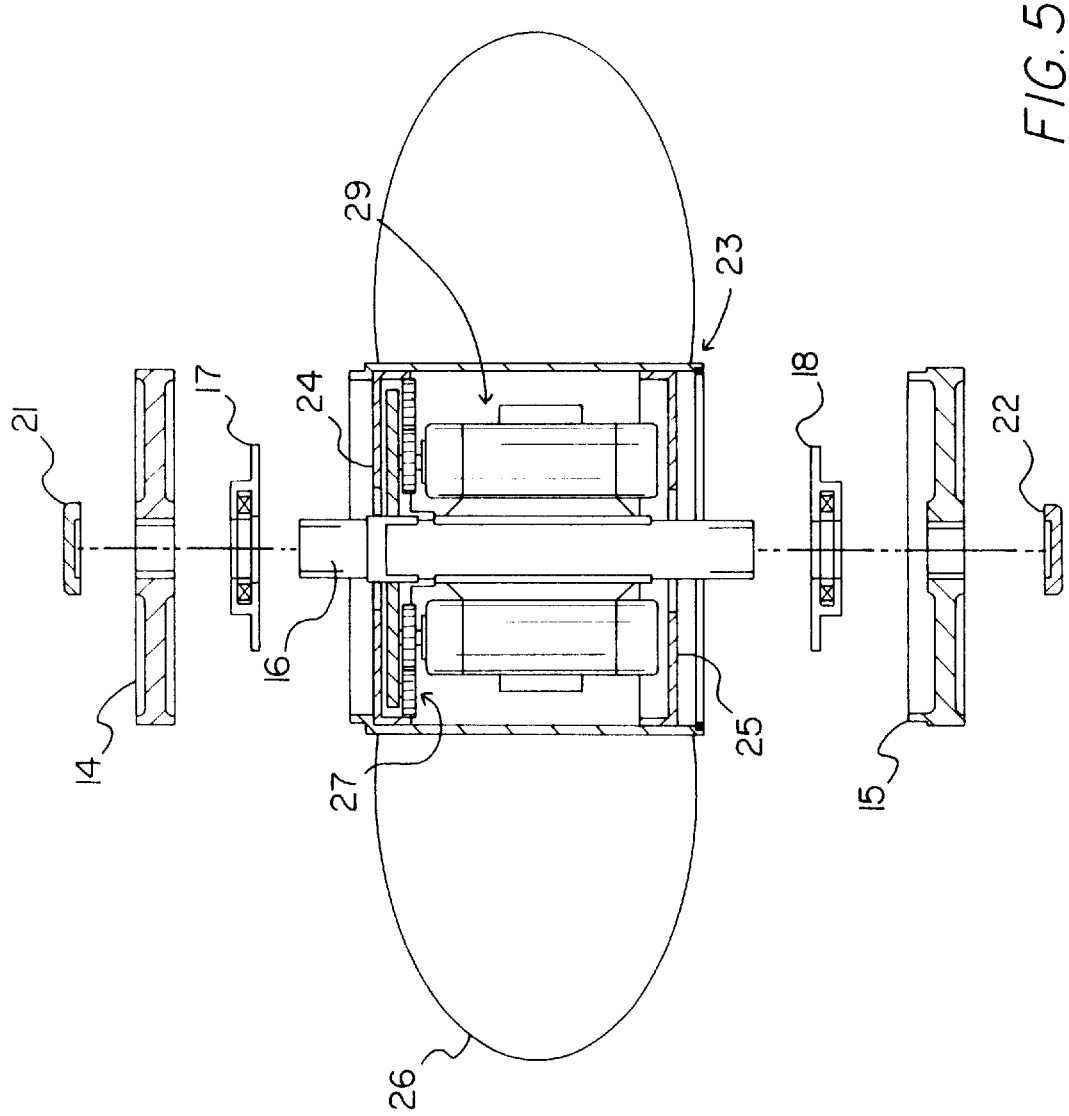
FIG. 5 is an exploded isometric illustration of the turbine assembly.

As shown in FIG. 4, the rotor and turbine assembly (38) is supported by the upper support plate (14) and lower support plate (15) which do not rotate but serve to attach the contained unit to the top cap assembly (11) and bottom cap assembly (12) mentioned above.

The support plates (14, 15) also fix the support shaft (16) which also does not rotate thereby minimizing the actual number of components and hence weight of the parts that do rotate in the unit and mentioned later on. The actual method of fixing can be splining or keying or other suitable method to prevent the shaft (16) from rotating with respect to the fixed support plates (14, 15). The fixed support shaft (16) also carries the upper bearing assembly (17) and lower bearing assembly (18) about which the revolves the rotor (26).

The rotor unit assembly (26) may need to be sealed against water entry and for this, felt or any suitable seals may be used for the upper seal (19) and the lower seal (20). Upper retaining cap (21) and lower retaining cap (22) also serve to complete the sealing and to vertically locate the fixed support shaft (16). The rotor and generator sub-assembly (23) can be seen separated here from the upper and lower bearing assemblies (17, 18) and upper and lower support plates (14, 15).

The upper bearing plate (24) and lower bearing plate (25) are attached and rotate with the rotor (26). Their function is to support the rotor (26) in the first instance but also, in the case of the upper bearing plate (24), to transfer the rotational energy of the rotor (26) to the electrical generator unit (29) via a series of gears. The upper bearing plate (24) is itself an annular gear with internal teeth that act on the gear box (27).

Figure 6:
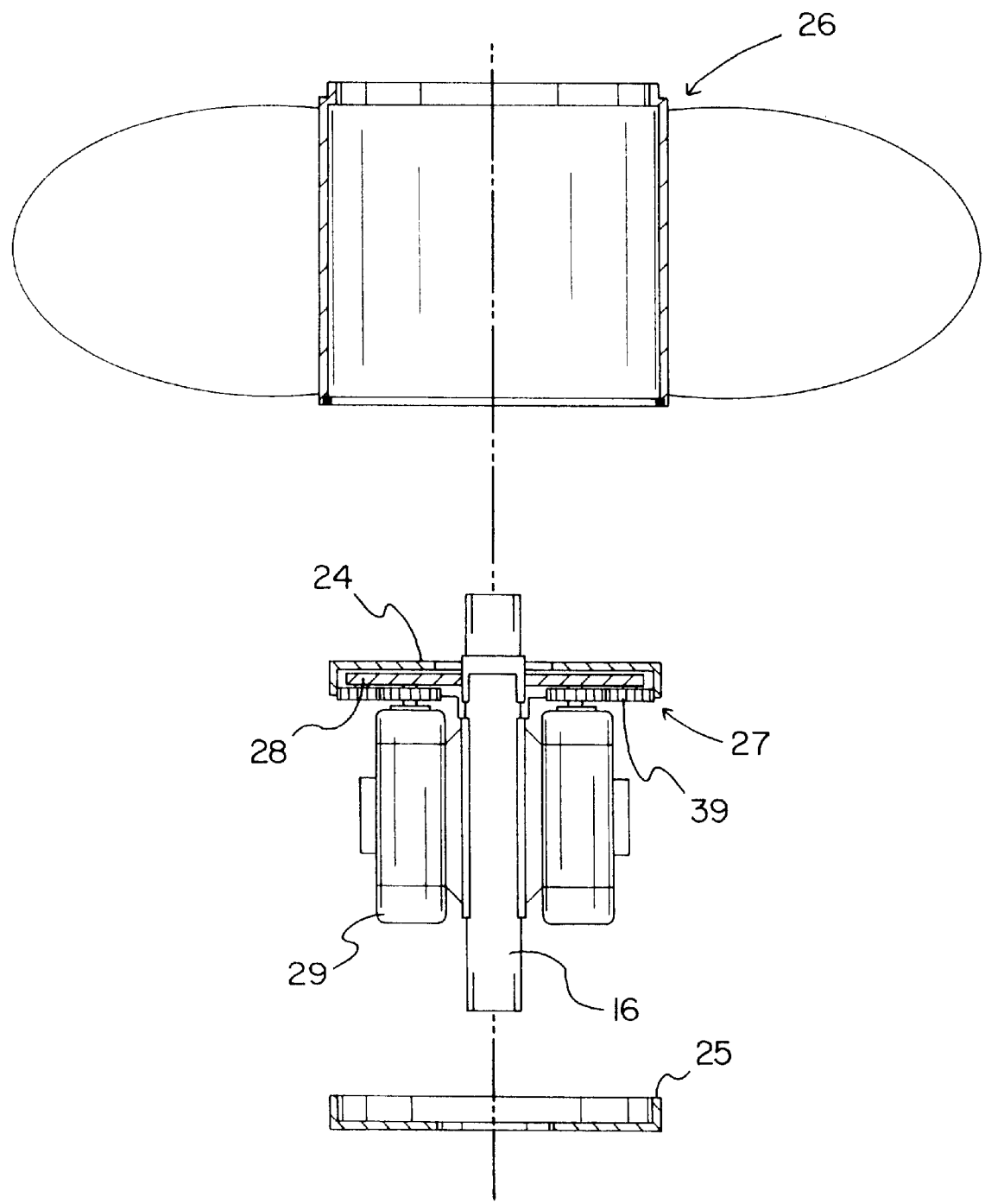
FIG. 6 is an exploded isometric illustration of the rotor and generator sub assembly.
Figure 7:
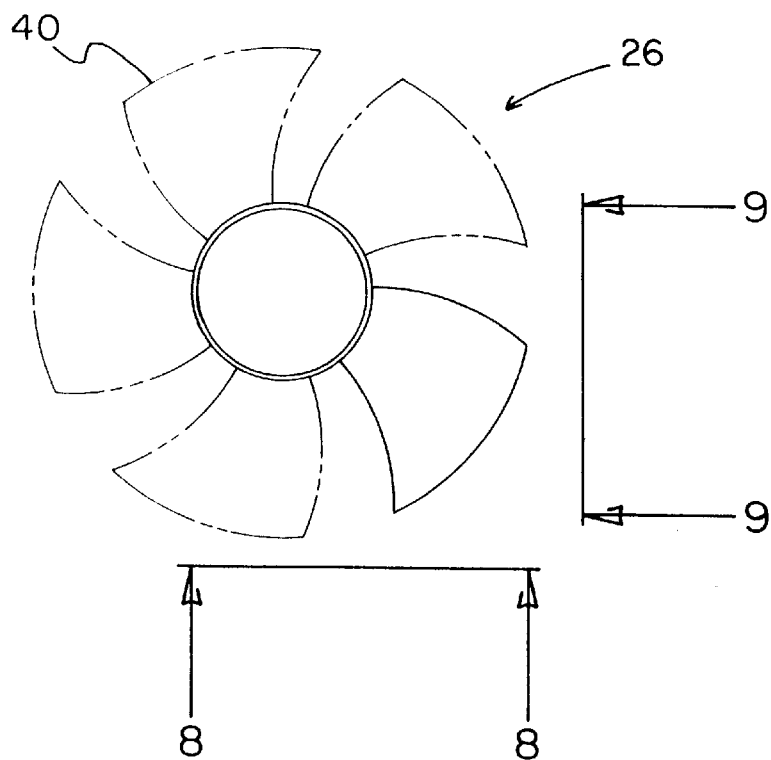
FIG. 7 is a top plan view of the rotor unit.
Figures 8, 9:
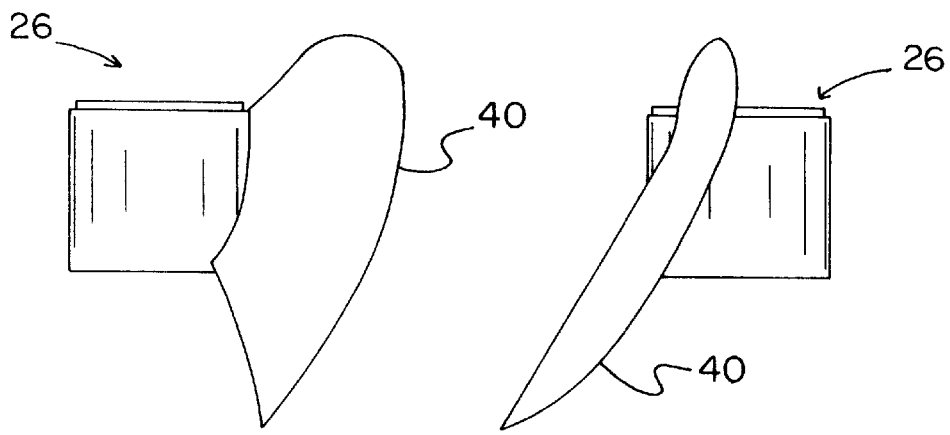
FIG. 8 is a side view of the rotor unit taken along the line 8—8 of FIG. 7.
FIG. 9 is a side view of the rotor unit taken along the line 9—9 of FIG. 7.

As depicted in FIGS. 6 and 7, the rotor unit (26) is the main rotating element of the turbine containing three to six blades (40) depending on the application. These blades (40) are pitched at a greater angle at the tip and shallower at the hub to accommodate for differences in relative speeds between the blades (40) and the water for varying distance from the central axis of the rotor unit (26).

A gear box assembly (27) accepts the rotational energy from the upper bearing plate gear (24) and transforms the torque and speed to suitable values depending on the application feeding it to the generator units (29). The number of sets of gears (39) used depends on the number of modular generator units (29) deployed in the application. A gear carrier (28) that does not rotate and is fixed by keying or other suitable method to the central fixed support shaft (16) is used to maintain the gear box gears (39) in their relative positions and prevent them from revolving around with the upper bearing plate (24). The shape of the gear carrier (28) depends on the number of modular generator units (29) deployed in the application.

The mechanical rotational energy is finally converted to electrical energy by the use of generator units (29) that are firmly attached to flat sections of the fixed support shaft (16) and do not themselves move. The number of generator units (29) deployed depends on the particular application, the annular space considerations and the available torque generated. Each generator unit (29) is fully sealed and submersible, the output cable (4) being also fully sealed.

In use, the inlet of the hydraulic turbine assembly (3) is designed to allow a free vortex to form, the energy of which is currently lost in the form of other turbulence. The source of this energy is a combination of various parameters including initial pre-swirl in the water, the Coriolis effect from the rotation of the Earth and the shape of the water reservoir (41). The low operating head, large flow rate and significant water swirl thus lends itself to the use of an axial flow type of hydraulic turbine as in the present hydraulic turbine assembly (3).

In use, it should also be understood that this hydraulic turbine assembly (3) may be used separately from the conventional hydroelectric generating system (35) of the dam (31) as a stand alone hydroelectric generating system. That is, the hydraulic turbine assembly (3) may be used so that water passing from the hydraulic turbine assembly (3) does not have to enter the conventional hydroelectric generation system (35) of the dam or it may be used in a system that does not include the conventional hydroelectric generating system (35).

Because of the low operating hydraulic head across this hydraulic turbine assembly (3), the majority of the energy to the conventional turbine arrangement for the dam would still be available. Thus, the total energy output of the system with the added hydraulic turbine assembly (3) would then be greater than that using only the conventional turbine arrangement.

One of the greatest strengths of the hydraulic turbine assembly (3) is that by drawing upon the Coriolis effect this invention does not thereby interfere with the operation of the conventional hydraulic turbine system of the dam (31). Accordingly, this invention does not contravene the conservation of energy principle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hydraulic turbine assembly, for a dam holding a water reservoir and having a conventional hydroelectric generating system and having a vertical water inlet pipe, said vertical water inlet pipe having a water inlet point and being extended into said water reservoir and being in fluid communication with said conventional hydroelectric generating system for delivering water to said conventional hydroelectric generating system and said water inlet point being positioned in said water reservoir to create an inlet free vortex formation within said water reservoir, said hydraulic turbine assembly comprising:

an outer housing tube having a means for collecting water from said inlet free vortex formation into said outer housing tube, and having a means for being in fluid communication with said vertical water inlet pipe to permit water to pass therethrough said outer housing tube to said vertical water inlet pipe;

a rotor unit being disposed within said outer housing tube and being mounted to said outer housing tube to permit rotation of said rotor unit within said outer housing unit, said rotor unit being rotated by water passing through said outer housing tube; and a generator unit for creating electrical energy being operationally coupled to said rotor unit, said generator unit creating electrical energy when said rotor unit is rotated.

2. The hydraulic turbine assembly of claim 1, wherein said means for collecting water from said inlet free vortex formation into said outer housing tube is an inlet cone being positioned at said water inlet point.

3. The hydraulic turbine assembly of claim 1, wherein said a means for being in fluid communication with said vertical water inlet pipe is an outlet draft tube, said outlet draft tube being mounted to said water inlet pipe.

4. A hydraulic turbine assembly, for a dam holding a water reservoir and having a conventional hydroelectric generating system and having a vertical water inlet pipe, said vertical water inlet pipe having a water inlet point and being extended into said water reservoir and being in fluid communication with said conventional hydroelectric generating system for delivering water to said conventional hydroelectric generating system, and said water inlet point being positioned in said water reservoir to create an inlet free vortex formation within said water reservoir, said hydraulic turbine assembly comprising:

an outer housing tube having an inlet cone and an outlet draft, said inlet cone being positioned at said water inlet point for collecting water from said inlet free vortex formation into said outer housing tube, said outlet draft being in fluid communication with said vertical water inlet pipe to permit water to pass therethrough said outer housing tube to said vertical water inlet pipe; and a rotor and turbine assembly having a rotor unit and at least one generator unit for creating electrical energy, said rotor and turbine assembly being disposed within said outer housing tube and being mounted to said outer housing tube to permit rotation of said rotor unit within said outer housing unit, said rotor unit being rotated by water passing through said outer housing tube, each of said generator units being operationally coupled to said rotor unit, each of said generator units transferring the rotational energy of said rotor unit into electrical energy.

5. The hydraulic turbine assembly of claim 4, wherein said inlet cone is shaped to minimize inlet hydraulic pressure losses and to locally increase water velocity entering said hydraulic turbine assembly, and wherein said outlet draft tube is shaped to reduce turbine exit velocity and to further increase the energy potential across said hydraulic turbine assembly.

6. The hydraulic turbine assembly of claim 4, wherein said rotor unit has a plurality of blades extending around its perimeter, said blades allowing said rotor unit to rotate when water passes through said outer housing tube.

7. The hydraulic turbine assembly of claim 4, wherein said outer housing tube has a top cap assembly and a lower cap assembly, said rotor and turbine assembly being mounted to said top cap assembly and being mounted to said lower cap assembly.

8. The hydraulic turbine assembly of claim 7, wherein said rotor and turbine assembly further comprises an upper support plate, a lower support plate, and a support shaft, said upper support plate being coupled to said top cap assembly, said lower support plate being coupled to said lower cap assembly, and said support shaft being fixedly coupled to said upper support plate and being fixedly coupled to said lower support plate, said support shaft, said upper support shaft and said lower shaft supporting said rotor and turbine assembly on said top cap assembly and said lower cap assembly.

9. The hydraulic turbine assembly of claim 8, wherein said rotor and turbine assembly further comprises an upper bearing assembly, a lower bearing assembly, an upper bearing plate, a lower bearing plate, and a gear box assembly, said upper bearing assembly being mounted on said support shaft, said lower bearing assembly being mounted on said support shaft, said upper bearing plate being rotatively mounted to said upper bearing assembly to permit rotation of said upper bearing plate around said support shaft, said lower bearing plate being rotatively mounted to said lower bearing assembly to permit rotation of said lower bearing plate around said support shaft, said rotor unit being coupled to said upper bearing plate and being coupled to said lower bearing plate to permit rotation of said rotor unit about said support shaft, said gear box assembly being operatively coupled to said upper bearing plate and being operatively coupled to each of said generator units to permit transfer of the rotational energy of the rotor unit to each of said generator units wherein said rotational energy is converted to electrical energy.

10. The hydraulic turbine assembly of claim 4, further comprising a vertical water inlet pipe having a water inlet point and being extended into said water reservoir and being in fluid communication with said conventional hydroelectric generating system for delivering water to said conventional hydroelectric generating system, and said water inlet point being positioned in said water reservoir to create an inlet free vortex formation within said water reservoir.

11. A hydraulic turbine assembly, for a dam holding a water reservoir and having a conventional hydrolelectric generating system and having a vertical water inlet pipe, said vertical water inlet pipe having a water inlet point and being extended into said water reservoir and being in fluid communication with said conventional hydroelectric generating system for delivering water to said conventional hydroelectric generating system, and said water inlet point being positioned in said water reservoir to create an inlet free vortex formation within said water reservoir, said hydraulic turbine assembly comprising:

an outer housing tube having an inlet cone, an outlet draft a top cap assembly, and a lower cap assembly, said inlet cone being positioned at said water inlet point for collecting water from said inlet free vortex formation into said outer housing tube, said inlet cone being shaped to minimize inlet hydraulic pressure losses and to locally increase water velocity entering said hydraulic turbine assembly, said outlet draft being in fluid communication with said vertical water inlet pipe to permit water to pass therethrough said outer housing tube to said vertical water inlet pipe, said outlet draft tube being shaped to reduce turbine exit velocity and to further increase the energy potential across said hydraulic turbine assembly;

an upper support plate being coupled to said top cap assembly;

a lower support plate being coupled to said lower cap assembly;

a support shaft being fixedly coupled to said upper support plate and being fixedly coupled to said lower support plate;

an upper bearing assembly being mounted on said support shaft;

a lower bearing assembly being mounted on said support shaft;

an upper bearing plate being rotatively mounted to said upper bearing assembly to permit rotation of said upper bearing plate around said support shaft;

a lower bearing plate being rotatively mounted to said lower bearing assembly to permit rotation of said lower bearing plate around said support shaft;

a rotor unit having a plurality of blades extending around its perimeter, said rotor unit being disposed within said outer housing tube, said rotor unit being coupled to said upper bearing plate and being coupled to said lower bearing plate to permit rotation of said rotor unit about said support shaft and within said outer housing tube, said blades allowing said rotor unit to rotate when water passes through said outer housing tube, said upper bearing plate and said lower bearing plate being rotated when said rotor unit is rotated;

at least one generator unit for creating electrical energy being disposed within said outer housing tube; and a gear box assembly being operatively coupled to said upper bearing plate and being operatively coupled to each of said generator units to permit transfer of the rotational energy of said rotor unit to each of said generator units wherein said rotational energy is converted to electrical energy.

12. The hydraulic turbine assembly of claim 4, further comprising a vertical water inlet pipe having a water inlet point and being extended into said water reservoir and being in fluid communication with said conventional hydroelectric generating system for delivering water to said conventional hydroelectric generating system, and said water inlet point being positioned in said water reservoir to create an inlet free vortex formation within said water reservoir.

* * * * *